United States Patent
Eisenmann et al.

(10) Patent No.: US 11,858,625 B1
(45) Date of Patent: Jan. 2, 2024

(54) OBJECT DETECTION USING PROPELLER NOISE

(71) Applicant: Amazon Technologies, Inc., Seattle, WA (US)

(72) Inventors: Shmuel Eisenmann, Seattle, WA (US); Ofer Rubin, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1059 days.

(21) Appl. No.: 16/448,311

(22) Filed: Jun. 21, 2019

(51) Int. Cl.
  *B64C 39/02* (2023.01)
  *B64C 27/46* (2006.01)
  *G01S 15/93* (2020.01)
  *B64C 19/02* (2006.01)

(52) U.S. Cl.
  CPC ............ *B64C 39/024* (2013.01); *B64C 19/02* (2013.01); *B64C 27/46* (2013.01); *G01S 15/93* (2013.01); *B64U 2201/00* (2023.01)

(58) Field of Classification Search
  CPC ....... B64C 39/024; B64C 19/02; B64C 27/46; G01S 15/93; B64U 2201/00
  See application file for complete search history.

(56) References Cited

U.S. PATENT DOCUMENTS

| | | | | |
|---|---|---|---|---|
| 10,006,747 B2 * | 6/2018 | Cohen | ..................... | F41H 11/02 |
| 10,935,630 B2 * | 3/2021 | Swanson | ............... | G01S 3/8022 |
| 2015/0160658 A1 * | 6/2015 | Reedman | ............. | G05D 1/0088 701/3 |
| 2017/0059704 A1 * | 3/2017 | Xie | .......................... | G01S 15/10 |
| 2017/0219686 A1 * | 8/2017 | Xie | .......................... | G01S 11/14 |
| 2018/0246215 A1 * | 8/2018 | Yang | ....................... | B64D 47/00 |
| 2018/0322348 A1 * | 11/2018 | Sweet, III | ............... | G01S 7/497 |
| 2018/0356507 A1 * | 12/2018 | Ichinose | ................... | G01S 7/03 |
| 2019/0275938 A1 * | 9/2019 | Matsushita | ............. | E05F 15/73 |

FOREIGN PATENT DOCUMENTS

| | | | | |
|---|---|---|---|---|
| CH | 210450 A | * | 7/1940 | |
| CN | 108594242 A | * | 9/2018 | ............. G01S 15/93 |

* cited by examiner

*Primary Examiner* — Daniel Pihulic
(74) *Attorney, Agent, or Firm* — Athorus, PLLC (57) ABSTRACT

Disclosed are systems and methods to detect objects within an environment by an aerial vehicle. An aerial vehicle may detect objects within an environment based on propeller noises emitted by the aerial vehicle that are reflected back to the aerial vehicle by objects in the environment. The propeller noise may be noise that is generated during normal operation of one or more propellers. The propeller noise emitted by the propellers of the aerial vehicle propagates into the environment around the aerial vehicle and reflects off any objects within the environment. Because the noise generated by each propeller is distinguishable, sets of solutions (distance and all directions) may be computed for each propeller. The intersections of those sets of solutions is representative of the actual distance and direction of the object with respect to the aerial vehicle.

20 Claims, 7 Drawing Sheets

OBJECT DETECTION USING PROPELLER NOISE

BACKGROUND

Unmanned vehicles, such as unmanned aerial vehicles, automated ground vehicles, and water based automated vehicles, are continuing to increase in use. For example, aerial vehicles are often used by hobbyists to obtain aerial images of buildings, landscapes, etc. While there are many beneficial uses of these vehicles, operating and navigating aerial vehicles safely and efficiently within various environments may be challenging. To maintain safety, various object detection and avoidance systems and methods may be incorporated into aerial vehicles, such as radar systems, imaging systems, or others. However, dedicated object detection and avoidance systems may add cost, weight, and complexity to aerial vehicles. Accordingly, there is a need for systems and methods to detect objects within environments without the added cost, weight, and complexity of dedicated systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods to detect objects within an environment by an aerial vehicle are described herein. In example implementations, an aerial vehicle may detect objects within an environment based on propeller noises emitted by the aerial vehicle that are reflected back to the aerial vehicle by objects in the environment. Propeller noise may be noise that is generated during normal operation of one or more propellers. Because the revolutions per minute ("RPM") for each propeller change frequently, noises generated by the different propellers and by the propellers themselves change over time. The propeller noises emitted by the propellers of the aerial vehicle propagate into the environment around the aerial vehicle and reflect off objects within the environment. By calculating the time differences between similar time series of the blade pass frequency ("BPF"), which is the rate at which blades pass a fixed position and is equal to the number of blades times the RPM/60, one can detect those objects within a vicinity of an aerial vehicle.

The one or more microphones may comprise omnidirectional microphones, directional microphones, or combinations thereof. In addition, one or more microphones may be placed at various locations on the aerial vehicle, such as on a central fuselage, frame, or body of the aerial vehicle, around a periphery of the aerial vehicle, outside airflows generated by one or more propellers, e.g., to improve the capability of the microphones to receive reflections and/or to avoid interference between emitted propeller noise and received reflections of that noise, or other locations. Further, one or more directional microphones may be oriented to receive reflections of propeller noise from various directions relative to the aerial vehicle, such as various directions pointing radially outward from the aerial vehicle, various directions above or below the aerial vehicle, or other directions. In some implementations, a single microphone, such as an omni-directional microphone may be placed at an asynchronous location on the aerial vehicle such that the distance between the microphone and each propeller is different. Likewise, the microphone may be offset and in a different plane than one or more of the propellers of the aerial vehicle.

While the examples discussed herein refer to a microphone, any form of audio sensor that is capable of detecting or otherwise receiving acoustic signals/noise, are equally applicable to the described implementations. Accordingly, discussion of a microphone should not be construed as limiting. Likewise, any number and combinations of microphones may be used with the disclosed implementations.

In further example implementations, an aerial vehicle may include one or more processors to process or analyze the received reflections of propeller noise to detect objects within the environment of the aerial vehicle. Various properties of the received reflections, such as time of flight, BPF, amplitude, Doppler effect, or other properties, may be detected and correlated with known properties or characteristics of the emitted propeller noise, such as time of flight, BPF, amplitude, or other properties, based on known operational and/or structural characteristics of the one or more propellers that generated the propeller noise.

Based on detected objects, an aerial vehicle may control, instruct, or modify its operation and navigation, e.g., to avoid the detected objects, to modify its flight plan, to land or take off safely, to adjust its speed, direction, location, altitude, or other flight parameters, or to control other aspects related to operation and navigation. In this manner, an aerial vehicle may detect objects and/or properties of objects within the environment of the aerial vehicle using one or more microphones or other audio sensors, without need for dedicated systems for object detection and avoidance that may add cost, weight, and complexity.

Figure 1:
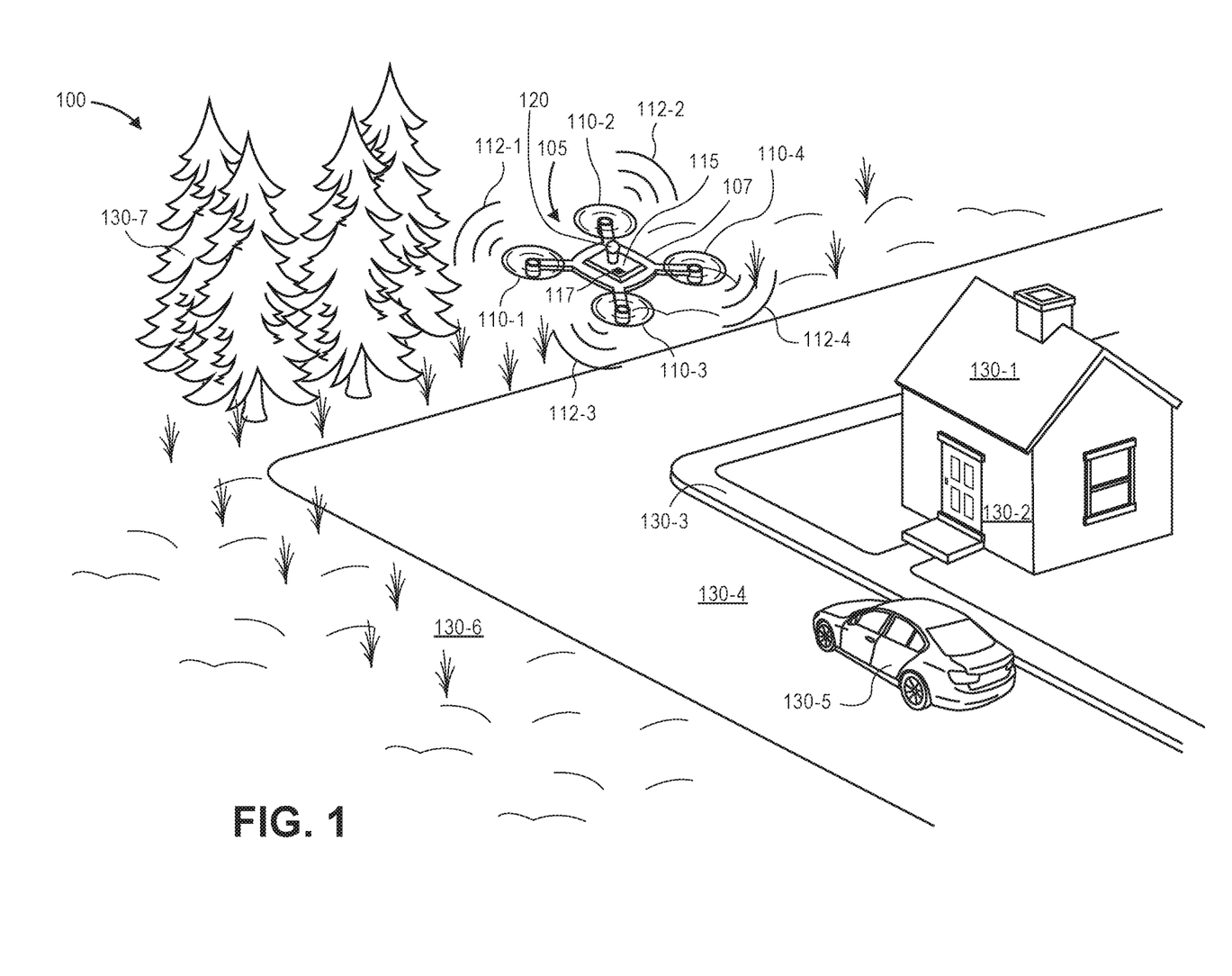
FIG. 1 is a schematic diagram of example object detection within an environment by an aerial vehicle using propeller noise, in accordance with disclosed implementations.

FIG. 1 is a schematic diagram 100 of example object detection within an environment by an aerial vehicle 105 using propeller noise, in accordance with disclosed implementations.

As illustrated in FIG. 1, an aerial vehicle 105 may include a frame or body 107, and a plurality of propulsion mechanisms, such as motors and propellers 110, coupled to the frame or body 107. The frame or body 107 may be formed of any suitable materials, such as carbon fiber, metals, plastics, or combinations thereof. In addition, the motors and propellers 110 may be coupled to the frame or body 107, or via one or more motor arms extending from the frame or body 107. The motors may be any suitable motors for rotating respective propellers 110 to generate thrust to lift or maneuver at least a portion of the aerial vehicle 105. The propellers 110 may be formed of any suitable materials, such as carbon fiber, metals, plastics, or combinations thereof. Further, the aerial vehicle 105 may also include a control system 115 that may control operation and navigation of the aerial vehicle 105, including aspects related to operation of the motors and propellers 110 to generate propeller noise.

Although FIG. 1 shows an aerial vehicle having a particular shape, size, number of motors and propellers 110-1, 110-2, 110-3, 110-4, and overall configuration, the systems and methods described herein may be utilized with aerial vehicles having various other shapes, sizes, numbers of motors and propellers, and overall configurations, such as tricopters, quadcopters, hexacopters, octocopters, or various other types of aerial vehicles. In addition, aerial vehicles may include other types of propulsion mechanisms, such as fans, jets, turbojets, turbo fans, jet engines, electric jets, and/or combinations thereof, that may generate noise patterns.

In example implementations, the aerial vehicle 105 may be navigating within an environment having various types of objects 130. For example, as shown in FIG. 1, the objects 130 may include a roof 130-1 of a building, walls 130-2 of a building, a sidewalk 130-3, a street 130-4, a ground based vehicle 130-5, a field 130-6, and trees 130-7. Various other types of objects, including fixed, static, mobile, natural, manmade, artificial, temporary, permanent, or other types of objects, obstacles, or structures, may be present in various other environments.

During operation of the aerial vehicle 105, the propellers 110 of the aerial vehicle generate and emit propeller noise 112 that propagates from the aerial vehicle 105 into the environment. For example, each of the propellers 110-1, 110-2, 110-3, 110-4 may emit respective propeller noise 112-1, 112-2, 112-3, 112-4 during operation or navigation of the aerial vehicle 105. Because the BPF of each propeller may vary with time and with respect to other propellers, the propeller noise 112 generated by each propeller may be distinguished from the noise generated by each of the other propellers.

The propeller noise 112 may propagate from the aerial vehicle 105 into the environment and be at least partially reflected back to the aerial vehicle 105 by objects 130 within the environment. At least a portion of the propeller noise 112 may be reflected back to the aerial vehicle 105 from one or more objects 130, and various properties of the objects 130 may affect various properties of the reflections of the noise back to the aerial vehicle 105.

The aerial vehicle 105 may also include one or more microphones 120 that may receive reflections of the emitted propeller noise 112. The one more microphones or audio sensors 120 may be omnidirectional, directional, or combinations thereof, and may be placed at various locations of the aerial vehicle 105. Likewise, the microphones 120 may be in the same plane as one or more of the propellers 110 or may be in a different plane than one or more of the propellers 110. As illustrated in FIG. 1, the microphone 120 is in a different plane than the propellers 110 and is positioned such that the distance between the microphone 120 and each of the propellers 110 is different. As discussed herein, by positioning the microphone 120 in a plane that is different than the plane of the propellers 110 and positioning the microphone 120 such that the distances between the microphone 120 and the propellers 110 are different, increases the ability to determine the direction of the object with respect to the aerial vehicle and the distinguish between the different propellers.

In addition, the aerial vehicle 105 may include an analysis unit 117 that includes one or more processors that may process or analyze the emitted propeller noise and the received reflections of that noise and detect objects within a vicinity of the aerial vehicle 105. The analysis system may be included as part of the control system 115 or independent of the control system 115.

Accordingly, with incorporation of one or more microphones, the aerial vehicle 105 may be configured to detect objects within a vicinity of the aerial vehicle and control its operation and navigation based on such detected objects, without need for dedicated systems for object detection and avoidance that may add cost, weight, and complexity. As a result, as shown in FIG. 1, the aerial vehicle 105 may operate safely and efficiently within an environment, e.g., by detecting objects around the aerial vehicle, by avoiding collisions with objects, by navigating safely and efficiently in crowded or variable environments, by modifying its operation based on changes within the environment, and by various other controls and modifications based on detected objects and properties.

Figure 2:
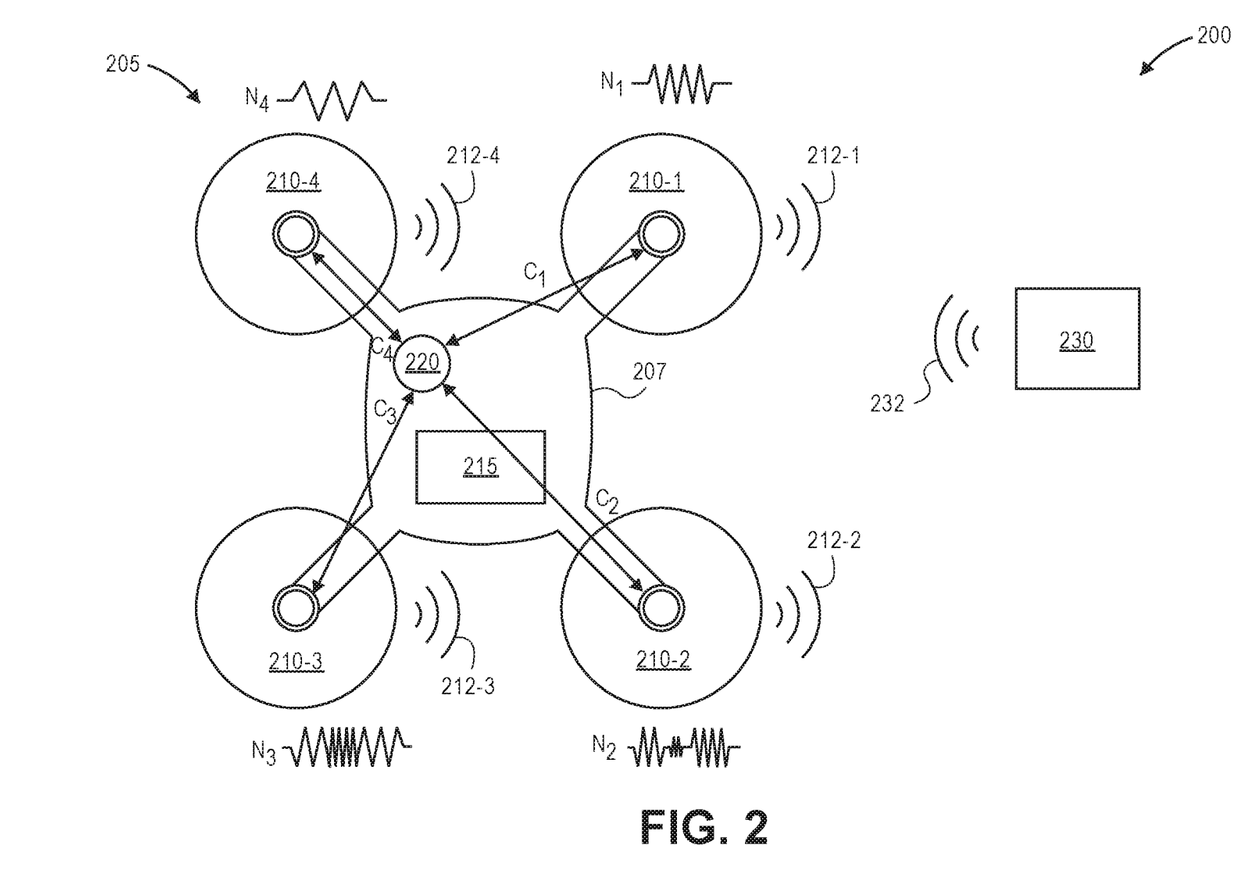
FIG. 2 is a schematic diagram of another example object detection by an aerial vehicle using one or more propeller noises and one or more microphones, in accordance with disclosed implementations.

FIG. 2 is a schematic diagram 200 of an example object detection by an aerial vehicle 205 using one or more propeller noise patterns and one or more microphones, in accordance with disclosed implementations.

The aerial vehicle 205 illustrated in FIG. 2 may include any and all of the features of any of the aerial vehicles described herein. As illustrated in FIG. 2, an aerial vehicle 205 may include a frame or body 207, and a plurality of propulsion mechanisms, such as motors and propellers 210, coupled to the frame or body 207. The frame or body 207 may be formed of any suitable materials, such as carbon fiber, metals, plastics, or combinations thereof. In addition, the motors and propellers 210 may be coupled to the frame or body 207, or via one or more motor arms extending from the frame or body 207. The motors may be any suitable motors for rotating respective propellers 210 to generate thrust to lift or maneuver at least a portion of the aerial vehicle 205. The propellers 210 may be formed of any suitable materials, such as carbon fiber, metals, plastics, or combinations thereof. Further, the aerial vehicle 205 may also include a control system 215, as further described herein, that may control operation and navigation of the aerial vehicle 205, including aspects related to operation of the motors and propellers 210 to generate propeller noise.

Although FIG. 2 shows an aerial vehicle having a particular shape, size, number of motors and propellers 210-1, 210-2, 210-3, 210-4, and overall configuration, the systems and methods described herein may be utilized with aerial vehicles having various other shapes, sizes, numbers of motors and propellers, and overall configurations, such as tricopters, quadcopters, hexacopters, octocopters, or various other types of aerial vehicles. In addition, aerial vehicles may include other types of propulsion mechanisms, such as fans, jets, turbojets, turbo fans, jet engines, electric jets, and/or combinations thereof, that may generate noise patterns.

The aerial vehicle 205 may include four motors and propellers 210-1, 210-2, 210-3, 210-4, and each of the four motors and propellers 210-1, 210-2, 210-3, 210-4 emit propeller noises 212-1, 212-2, 212-3, 212-4. Because the BPF of each propeller changes with respect to time and is different for different propellers, the noises 212-1, 212-2, 212-3, 212-4 emitted from each propeller is different from that emitted by any other propeller 210 during operation or rotation of the propellers. The waveforms $N_1$, $N_2$, $N_3$, $N_4$ of the propeller noise 212 are illustrated in FIG. 2 only for exemplary purposes, and the waveforms N may include various other combinations of properties, such as frequency, amplitude, patterns, sequences, or other properties. For example, the waveforms N of the propeller noise 212 may depend upon operational characteristics of the propellers 210, such as RPM, patterns or sequences of rotational rates, pitches of blades, or other characteristics, and/or may depend upon structural characteristics of the propellers 210, such as number of blades, pitch, span, chord length, thickness, material, surface features, or other structural characteristics.

The aerial vehicle 205 may also include one or more microphones or audio sensors 220. As shown in FIG. 2, the aerial vehicle 205 may include a single, omnidirectional microphone 220 that is coupled at a central location of the frame or body 207. The omnidirectional microphone 220 may be configured to receive sound waves from substantially all directions around the omnidirectional microphone 220. In addition, the microphone 220 may be placed at a location that is outside of any airflows generated during operation of the propellers 210, e.g., to improve the capability of the microphone 220 to receive reflections of propeller noise 212 and/or to avoid interference between emitted propeller noise and received reflected noise.

The microphone 220 may be at any position on or in the vehicle. In the illustrated example, the microphone 220 is asymmetrically positioned on the aerial vehicle 205 so that the distance between the microphone 220 and each propeller 210 is different. In this example, each of the distances $C_1$, $C_2$, $C_3$, $C_4$ between the microphone 220 and each propeller 210-1, 210-2, 210-3, 210-4 are different. In other examples, the microphone 220 may be at other positions on the aerial vehicle such that some or all of the distances $C_1$, $C_2$, $C_3$, $C_4$ are the same, or substantially the same. For example, the microphone may be positioned so that the distances $C_1$ and $C_4$ are the same and the distances $C_2$ and $C_3$ are the same. In other examples, the microphone 220 may be positioned so that the distances $C_1$ and $C_2$ are the same and the distances $C_3$ and $C_4$ are the same. In still other examples, the microphone 220 may be positioned so that all of the distances $C_1$, $C_2$, $C_3$, $C_4$ are the same.

The propeller noise 212 from one or more of the propellers 210 may propagate from the aerial vehicle 205 outward into the environment, and may be reflected back as reflected noise 232 from an object 230 within the environment. The object 230 may have various properties, such as shape, size, position, orientation, range, relative speed, material, surface properties, temperature, and other properties, and the reflections 232 of the propeller noise 212 may have various properties or changes to properties, such as frequency, amplitude, Doppler effect, patterns, sequences, or other properties, that may correspond to various properties of the object 230.

In the example implementation of FIG. 2, because each of the propellers 210 may emit a particular waveform $N_1$, $N_2$, $N_3$, $N_4$ of the propeller noise 212 that may be distinct from those generated by other propellers 210, reflected noise 232 that is reflected by an object 230 and received by the microphone 220 may be distinguished with respect to the particular propeller 210 and associated propeller noise 212 that resulted in the noise 232 reflected back by the object 230. In addition, because the aerial vehicle includes a single, omnidirectional microphone 220, noise 232 that is reflected back by an object 230 and received by the microphone 220, alone, may not be able to be distinguished with respect to a particular location or direction of the object 230 that reflected 232 the propeller noise relative to a position or orientation of the aerial vehicle 205. However, because each of the propellers 210 may emit a particular waveform $N_1$, $N_2$, $N_3$, $N_4$ of the propeller noise 212 that may be distinct from those generated by other propellers 210, the particular times of flight of different waveforms N that are received as reflections 232 by the microphone 220 may be used to determine the location of the object relative to a position or orientation of the aerial vehicle 205.

Do to varying environment conditions, the RPM of each propeller is continually adjusted by the controller 215 to keep the aerial vehicle airborne and at a desired position, heading, altitude, orientation, etc. Small perturbations in the environment cause the RPM to be continually changed for each propeller around some mean value. As a result, the varying RPM for each propeller is effectively randomly selected from a Gaussian distribution around some $RPM_0$ with a full-width half-maximum ("FWHM") of some $\Delta RPM$. As a result, each propeller generates acoustic power at the BPF, which can be computed as:

$$BPF = N_b * RPM/60$$

where $N_b$ is the number of blades of the propeller.

The microphone 220 detects the sound emitted by each propeller 210 at an initial time for each propeller and also detects any reflections from surfaces around the vehicle 200 shifted in time by the amount of time it takes the sound to propagate from the propeller 210, reflect off the object 230, and return back to the microphone 220. A difference between the two times for signals (noise) with the same frequencies may then be computed and used to estimate the distance to the object 230 as:

$$r = \Delta t * v_s$$

where $v_s$ is the speed of sound. This estimation can be realized by calculating the auto-correlation signal of a spectrogram or on the acoustic signal itself.

Because reflections may not come from a direction along a line connecting the propeller 210 and microphone 220, there may be many solutions (distance, direction) for each frequency at a given $\Delta t$. Solving the below equation (for ease of discussion, the equation below assumes only a solution in x-y plane, i.e. a two-dimensional problem) produces a circle on which the closest object solution is:

$$2y^2 - 2c_y y - \frac{1}{4}\left(\frac{\Delta t}{v_s}\right)^2 - x^2 - (x - c_x)^2 - c_y^2 = 0$$

where $[c_x, c_y]$ is the location of the propeller 210 and the microphone 220 is assumed to be at the origin [0,0] and [x,y]

is relative to the microphone. By measuring sets of solution (x and y) for each propeller, circles may be generated for each propeller and the intersection of each circle indicates the measured distance and all directions of the object 230 with respect to the aerial vehicle. The measure distance and all solutions computed for each propeller are referred to herein as a set of solutions.

Figure 3:
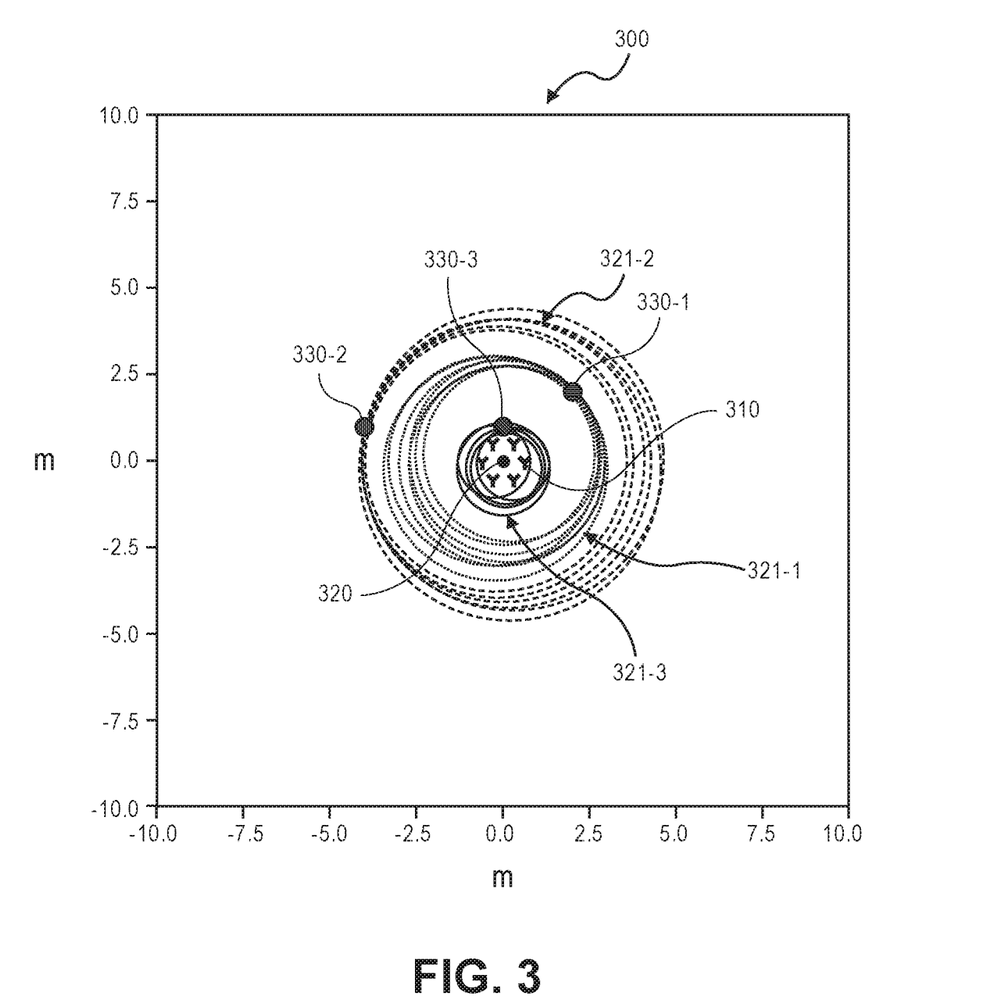
FIG. 3 is a graphical illustration of circles computed from reflected noise produced from each propeller of an aerial vehicle, in accordance with described implementations.

For example, FIG. 3 is a graphical illustration of circles computed from reflected noise produced from each propeller of an aerial vehicle, in accordance with described implementations. In the illustrated example, the aerial vehicle includes six propellers 310 and a single microphone 320. The propeller noise generated by each propeller 310 radiates from the propeller, is detected by the microphone at an initial time, reflects off the objects 330-1, 330-2, 330-3 and is again detected at subsequent times by the microphone 320 as reflected noise. Utilizing the above equations and the time differences for each detected frequency produced by the propellers, sets of solutions, represented as circles 321, are formed from each propeller. For example, the reflections from propeller noise reflecting off a first object 330-1 may be used to compute, for each propeller, sets of solutions, represented as the six circles 321-1, propeller noise reflecting off of a second object 330-2 may be used to compute, for each propeller, sets of solutions, represented as the circles 321-2, and propeller noise reflecting off of a third object 330-3 may be used to compute, for each propeller, sets of solutions, represented as the circles 321-3.

By computing sets of solutions as represented by the circles for each propeller, each of which produce different BPFs, a component of noise, the position of the objects 330 may be determined with respect to the aerial vehicle at a point in which the sets of solutions intersect for the object, as illustrated. For example, in FIG. 3, the position of the objects may be measured in meters from a center point of the aerial vehicle and/or from a position of the microphone 320, as illustrated by the horizontal and vertical axis. The intersection of each of the sets of solutions is the actual distance and direction of the object with respect to the aerial vehicle.

The above equation and discussion with respect to FIG. 3 is provided in the two-dimensional space for ease of discussion and explanation. It will be appreciated that the disclosed implementations may likewise be utilized to determine a distance and direction of one or more objects with respect to a vehicle in three-dimensions (x-y-z). For example, utilizing the disclosed implementations, the following equation may be used to determine solutions that result in a sphere on which the closest object solution is:

$$[(x-c_x)^2+(y-c_y)^2+(z-c_z)^2]^{\frac{1}{2}}+$$
$$[x^2+y^2+z^2]^{\frac{1}{2}}-[c_x^2+c_y^2+c_z^2]^{\frac{1}{2}}=\frac{v_s \Delta t}{2}$$

where $[c_x, c_y, c_z]$ is the location of the propeller and the microphone is assumed to be at the origin $[0,0,0]$ and $[x,y,z]$ is relative to the microphone. By measuring sets of solutions (x, y, z) for each propeller, spheres may be generated for each propeller and the intersection of each sphere indicates the actual distance and direction of the object with respect to the aerial vehicle in a three-dimensional space.

In some implementations, an error may also be estimated for each sound source, or propeller. For example, the error may be based on the diameter of the propeller, which can be estimated, by dividing the diameter (D) by the speed of sound:

$$\Delta t_{err} = \frac{D_{propeller}}{v_s}$$

The error may then be applied to the computed circles/spheres as illustrative of the distance, considering error, of each detected object from the microphone of the aerial vehicle. In some implementations, the distance to an object may be indicated as a range that is the computed distance, plus or minus the error. In other implementations, the distance to a detected object may consider worst case scenario and represent the object as the computed distance minus any error (i.e., closer to the aerial vehicle).

In addition, because the speed of sound is a function of environmental conditions (e.g., temperature, air density, humidity, etc.), the above equations may be adjusted or calibrated during flight to account for any changes in the speed of sound resulting from measured environmental conditions. For example, the speed of sound $v_s$, may be continually calibrated as:

$$v_s = \frac{c}{\Delta t}$$

where c is the distance between propeller and microphone. The calibrated measure of the speed of sound may be continually or periodically updated during flight based on measured environmental characteristics and utilized in determining the distance of any detected objects from the aerial vehicle.

In still other examples, Doppler shift (or Doppler effect), which is the change in frequency or wavelength of the noise in relation to movement of the aerial vehicle and/or objects off which the noise reflects may also be considered when computing the distance between the object and the aerial vehicle, in accordance with disclosed implementations. For example, the BPF component may be represented as:

$$\frac{\Delta BPF}{BPF} = \frac{v}{v_s}$$

For $$v < 3 \frac{m}{s}$$

the change is less than a one-percent shift in frequency assuming the RPM range usually used by hovering aircrafts, for $$v \sim 10 \frac{m}{s}$$

the change is approximately a three-percent shift in frequency. Like the calibrated measure of sound, the computed Doppler shift may be periodically or continually computed during flight and utilized in determining the distance of any detected objects from the aerial vehicle.

Figure 4:
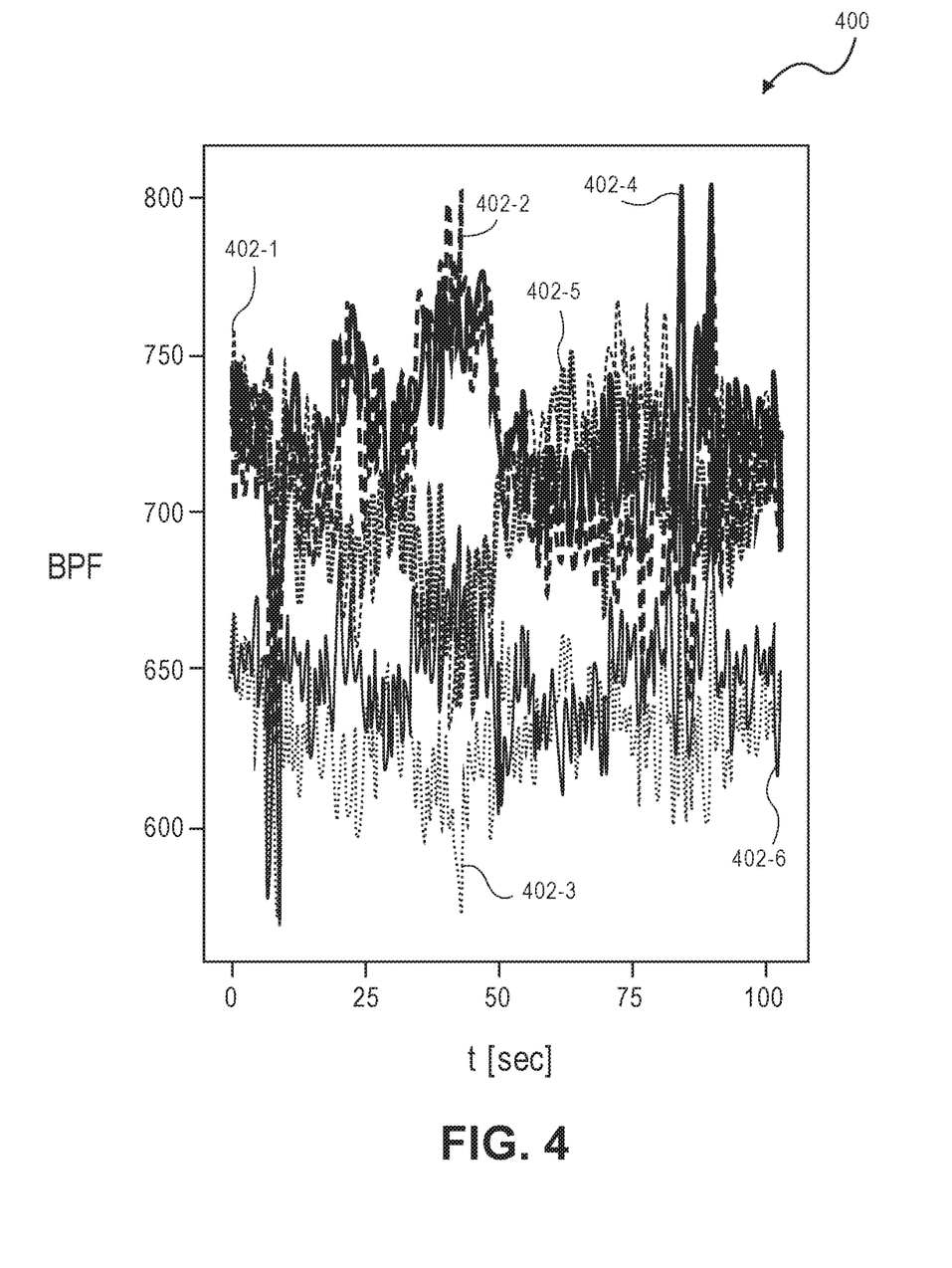
FIG. 4 illustrates a chart of the measured band pass frequencies for each of the six different propellers of the aerial vehicle discussed above with respect to FIG. 3, in accordance with disclosed implementations.

FIG. 4 illustrates a chart 400 of the measured BPFs 402-1, 402-2, 402-3, 4024, 402-5, 402-6 for each of the six different propellers of the aerial vehicle discussed above with respect to FIG. 3, in accordance with disclosed implementations. As illustrated, the BPF for each propeller is at a different frequency with respect to each other propeller and also changes with respect to time. The differences in BPF may be the result of different propeller configurations, different numbers of propeller blades on the propellers, different RPMs of the propellers, etc. Because the BPF for each propeller is different, measurements of reflected noise generated by each of the propellers may be distinguished and used to determine the position of an object that caused the reflection, as discussed herein.

Figure 5:
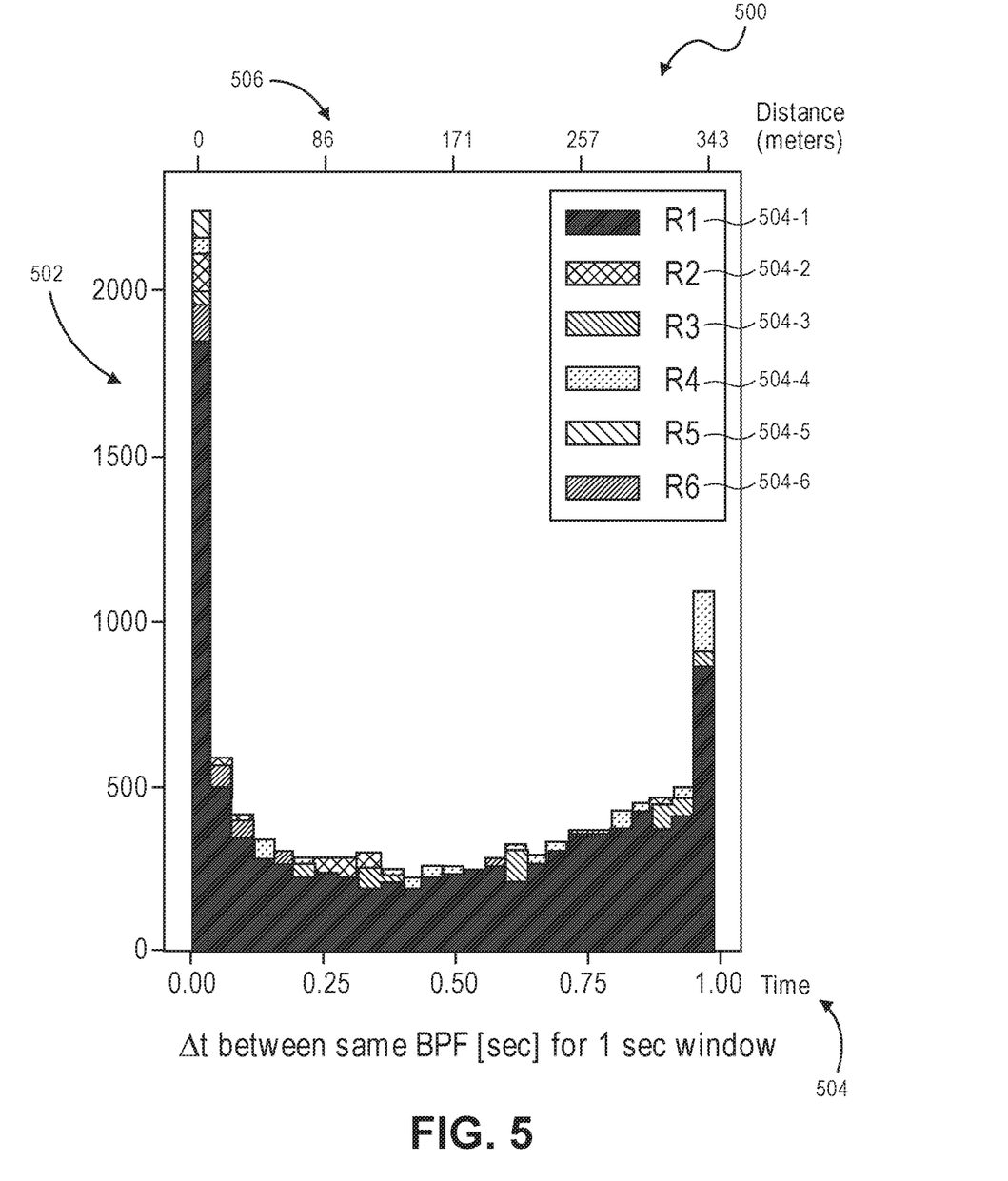
FIG. 5 illustrates the AT between the same band pass frequency for each of the six propellers discussed with respect to FIG. 3 over a one-second window, in accordance with disclosed implementations.

FIG. 5 illustrates a chart 500 of the distance and Δt 504-1, 504-2, 504-3, 504-4, 504-5, 504-6 between the same BPF for each of the six propellers discussed with respect to FIG. 3 over a one-second window, in accordance with disclosed implementations. In the example chart 600, the y-axis illustrates the occurrences of each BPF, and the x-axis illustrates both the Δt 604 and distance 606 during a one-second window. As illustrated, at the initial time, the occurrence count is high because it is the initial reading in the sample. For each subsequent reading for each frequency during the sample, the difference is representative of the difference between the initial time and the time at which the reflected noise is received by the microphone. The distance is the product of the speed of sound (343 meters/second) and the Δt.

Figure 6:
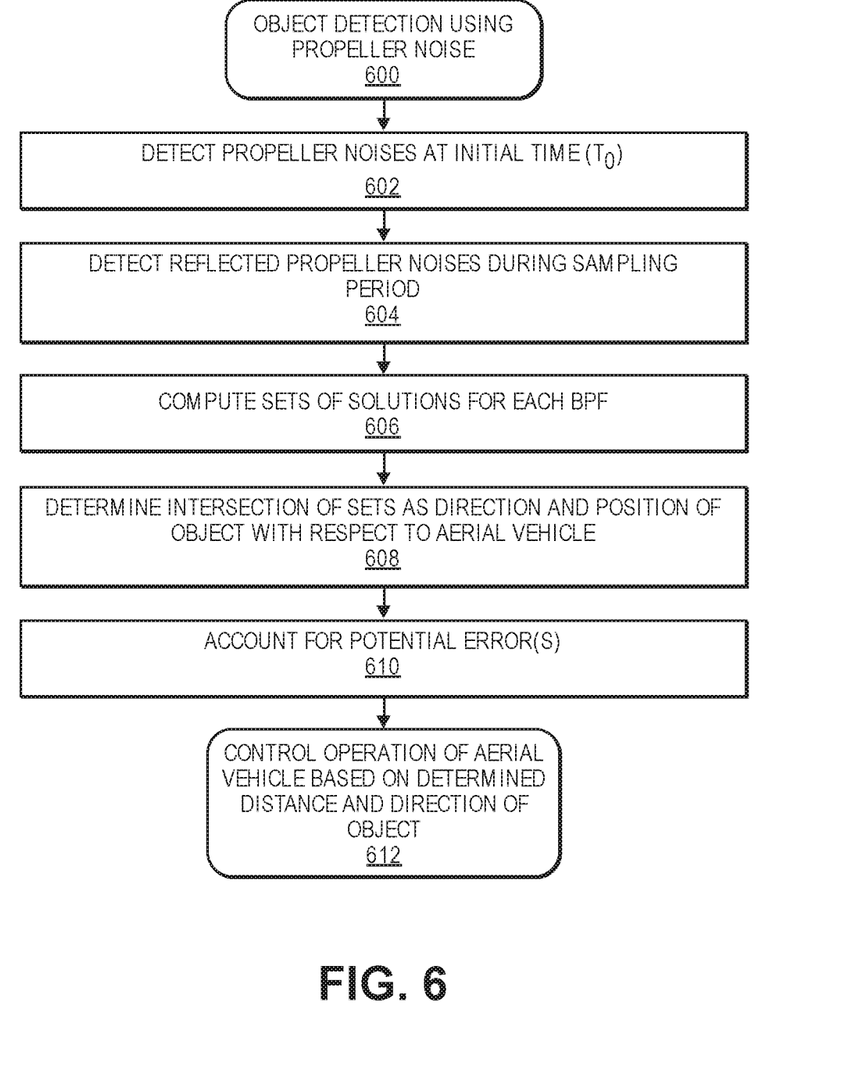
FIG. 6 is a flow diagram illustrating an example object detection process using propeller noise, in accordance with disclosed implementations.

FIG. 6 is a flow diagram illustrating an example object detection process using propeller noise 600, in accordance with disclosed implementations.

The process 600 may begin by detecting, at initial times for each propeller, propeller noises produced by propellers of a plurality of propellers (two or more propellers) using one or more microphones of an aerial vehicle, as at 602. The propeller noises may be emitted during any normal operation of the aerial vehicle and, as discussed above, the propeller noises may be different for each propeller of the plurality of propellers. As discussed above, the microphone may be positioned on the aerial vehicle such that it is at different distances from the propellers. As a result, the initial noises detected by the microphone may be received at different initial times for each of the propellers due to the differences in distances between the microphones and the propellers.

The example process 600 may then continue to receive at the microphone one or more reflections of the propeller noises during a sample period, such as one-second, as in 604. For example, a reflection of the noise generated by the first propeller may be received at a first time, a reflection of the noise generated by the second propeller may be received at a second time, a reflection of the noise generated by the third propeller may be received at a third time, etc.

As discussed above, because the reflections may not arrive in a line that connects the propeller and the microphone, there are many solutions of distance and direction that can generate a signal. As such, the example process 600 determines a set of solutions that include the measured distance and all directions for each BPF, as in 606. As discussed above with respect to FIG. 3, each set of solutions may be illustrated as a circle/sphere around the aerial vehicle. The intercepts of each set of solutions are then determined as the direction and position of the object with respect to the aerial vehicle, as in 608. In particular, there will be a solution (x,y) or (x,y,z) of each set of solutions that have the same or very similar values, as illustrated by the circle intercepts in FIG. 3. The common solution of each set of solutions is the actual distance and direction of the object that reflected the propeller noises with respect to the aerial vehicle.

In addition to determining the direction and position of the object based on the sets of solutions, the example process may also determine any potential errors in the computation, such as errors from a size of the source (e.g., propeller), Doppler shift, etc., as in 610. Those potential errors may then be used to adjust the determined distance or direction of the object with respect to the aerial vehicle, as discussed above. For example, one or more of the determined distance or direction of the object with respect to the aerial vehicle may be adjusted to account for the potential error.

The process 600 may then continue by controlling or adjusting operation of an aerial vehicle based on the determined distance and position of the object with respect to the aerial vehicle, as at 612. For example, based on the determined distance and position with respect to the aerial vehicle of a detected object, an aerial vehicle may be controlled, instructed, or commanded to operate or navigate, or to modify its operation or navigation, in a variety of ways. In some examples, an aerial vehicle may be instructed to avoid the detected object, an aerial vehicle may be instructed to modify its flight plan, an aerial vehicle may be instructed to land or take off, an aerial vehicle may be instructed to alter its speed, direction, location, or altitude, an aerial vehicle may be instructed to maintain a safe distance from the detected object, an aerial vehicle may be instructed to obtain vision information relating to the object, or an aerial vehicle may be instructed with various other actions or modifications to its operation.

In addition or alternatively to controlling operation of one or more aerial vehicles based on a determined distance and position of an object with respect to the aerial vehicle, in other example implementations, various other actions may be taken based on the determined one or more objects. For example, maps or models of one or more environments may be generated, modified, or updated based on determined objects. e.g., to facilitate aerial vehicle operations and navigation within such environments. In addition, information related to determined objects may be processed to understand changes to one or more environments, to indicate to other aerial vehicles or other objects detect within the environment, etc.

Figure 7:
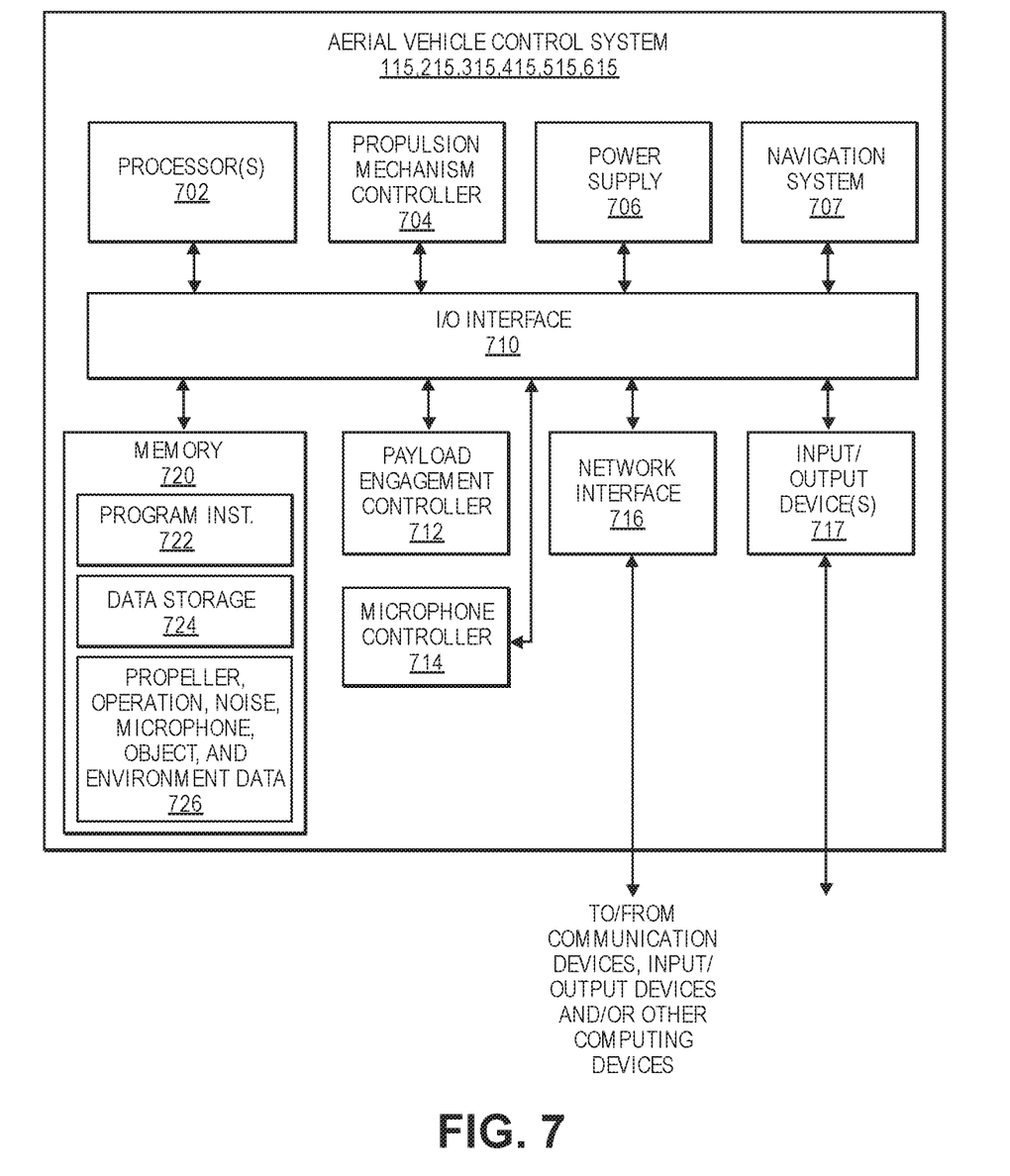
FIG. 7 is a block diagram illustrating various components of an example aerial vehicle control system, in accordance with disclosed implementations.

FIG. 7 is a block diagram illustrating various components of an example aerial vehicle control system 115, 215, 415, 515, in accordance with disclosed implementations.

In various examples, the block diagram may be illustrative of one or more aspects of the aerial vehicle control system that may be used to implement the various systems and methods discussed herein and/or to control operation of an aerial vehicle discussed herein. In the illustrated implementation, the aerial vehicle control system includes one or more processors 702, coupled to a memory, e.g., a non-transitory computer readable storage medium 720, via an input/output (I/O) interface 710. The aerial vehicle control system also includes propulsion mechanism controllers 704, such as electronic speed controls (ESCs) or motor controllers, power supplies or modules 706, and/or a navigation system 707. The aerial vehicle control system further includes a payload engagement controller 712, a microphone controller 714, a network interface 716, and one or more input/output devices 717.

In various implementations, the aerial vehicle control system may be a uniprocessor system including one processor 702, or a multiprocessor system including several processors 702 (e.g., two, four, eight, or another suitable number). The processor(s) 702 may be any suitable processor capable of executing instructions. For example, in various implementations, the processor(s) 702 may be generalpurpose or embedded processors implementing any of a variety of instruction set architectures (ISAs), such as the x86, PowerPC, SPARC, or MIPS ISAs. or any other suitable ISA. In multiprocessor systems, each processor(s) 702 may commonly, but not necessarily, implement the same ISA.

The non-transitory computer readable storage medium 720 may be configured to store executable instructions, data, propeller data, operational characteristics data, noise pattern data, microphone data, object data and properties thereof, environment data, and/or other data items accessible by the processor(s) 702. In various implementations, the non-transitory computer readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 720 as program instructions 722, data storage 724 and other data 726, respectively. In other implementations, program instructions, data, and/or other data may be received, sent, or stored upon different types of computer-accessible media, such as non-transitory media, or on similar media separate from the non-transitory computer readable storage medium 720 or the aerial vehicle control system. Generally speaking, a non-transitory, computer readable storage medium may include storage media or memory media such as magnetic or optical media, e.g., disk or CD/DVD-ROM, coupled to the aerial vehicle control system via the I/O interface 710. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 716.

In one implementation, the I/O interface 710 may be configured to coordinate I/O traffic between the processor(s) 702, the non-transitory computer readable storage medium 720, and any peripheral devices, the network interface or other peripheral interfaces, such as input/output devices 717. In some implementations, the I/O interface 710 may perform any necessary protocol, timing or other data transformations to convert data signals from one component (e.g., non-transitory computer readable storage medium 720) into a format suitable for use by another component (e.g., processor(s) 702). In some implementations, the I/O interface 710 may include support for devices attached through various types of peripheral buses, such as a variant of the Peripheral Component Interconnect (PCI) bus standard or the Universal Serial Bus (USB) standard, for example. In some implementations, the function of the I/O interface 710 may be split into two or more separate components, such as a north bridge and a south bridge, for example. Also, in some implementations, some or all of the functionality of the I/O interface 710, such as an interface to the non-transitory computer readable storage medium 720, may be incorporated directly into the processor(s) 702.

The propulsion mechanism controllers 704 may communicate with the navigation system 707 and adjust the rotational rate, position, orientation, blade pitch, or other parameters of each propulsion mechanism to implement one or more aerial vehicle flight plans or operations, and/or to perform one or more maneuvers and guide the aerial vehicle along a flight path and/or to a destination location. Although the description herein generally refers to motors and propellers that generate propeller noise patterns that may be reflected back by one or more objects, in other example implementations, aerial vehicles may include other types of propulsion mechanisms, such as fans, jets, turbojets, turbo fans, jet engines, electric jets, and/or combinations thereof, that may also generate noise that may be reflected back by one or more objects. In addition, one or more operational and/or structural characteristics of various other types of propulsion mechanisms may also be modified to select and generate particular noise patterns.

The navigation system 707 may include a global positioning system (GPS), indoor positioning system (IPS), or other similar system and/or sensors that can be used to navigate the aerial vehicle to and/or from a location. The payload engagement controller 712 communicates with the actuator(s) or motor(s) (e.g., a servo motor) used to engage and/or disengage items.

The microphone controller 714 may control operation of one or more microphones configured to receive reflections of emitted propeller noise patterns and/or propeller noise patterns emitted by other vehicles. As described herein, the operation of the one or more microphones may be cycled on and off as desired to receive propeller noise reflections, or to not receive reflections or propeller noise at particular times. Moreover, the operation of the one or more microphones may be configured or tuned to receive reflected noise within one or more desired ranges of frequency, so as to more reliably receive, distinguish, or identify reflected noise patterns.

The network interface 716 may be configured to allow data to be exchanged between the aerial vehicle control system, other devices attached to a network, such as other computer systems (e.g., remote computing resources), and/or with aerial vehicle control systems of other aerial vehicles. For example, the network interface 716 may enable wireless communication between the aerial vehicle and an aerial vehicle control system that is implemented on one or more remote computing resources. For wireless communication, an antenna of the aerial vehicle or other communication components may be utilized. As another example, the network interface 716 may enable wireless communication between numerous aerial vehicles. In various implementations, the network interface 716 may support communication via wireless general data networks, such as a Wi-Fi network. For example, the network interface 716 may support communication via telecommunications networks, such as cellular communication networks, satellite networks, and the like.

Input/output devices 717 may, in some implementations, include one or more displays, imaging devices, thermal sensors, infrared sensors, time of flight sensors, accelerometers, pressure sensors, weather sensors, various other sensors described herein, etc. Multiple input/output devices 717 may be present and controlled by the aerial vehicle control system. One or more of these sensors may be utilized to control functions or operations related to determining reflected propeller noise, processing reflected noise to detect objects, vehicles, and properties thereof, controlling or instructing operations of an aerial vehicle based on detected objects, vehicles, and properties thereof, and/or any other operations or functions described herein.

As shown in FIG. 7, the memory may include program instructions 722, which may be configured to implement the example routines and/or sub-routines described herein. The data storage 724 or other data 726 may include various data stores for maintaining data items that may be provided for operations and navigation of an aerial vehicle, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 115, 215, 415, 515 is merely illustrative and is not intended to limit the scope of the present disclosure. In particular, the computing system and devices may include any combination of hardware or software that can perform the indicated functions. The aerial vehicle control system may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the aerial vehicle control system may be transmitted to the aerial vehicle control system via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and control systems should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

While the above examples have been described with respect to aerial vehicles, the disclosed implementations may also be used for other forms of vehicles, including, but not limited to, ground based vehicles, unmanned ground based vehicles, water based vehicles, or unmanned water based vehicles.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical. Furthermore, as used herein, "horizontal" flight refers to flight traveling in a direction substantially parallel to the ground (e.g., sea level), and "vertical" flight refers to flight traveling substantially radially outward from or inward toward the earth's center. It should be understood by those having ordinary skill that trajectories may include components of both "horizontal" and "vertical" flight vectors.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method to detect objects, comprising:

instructing rotation of a plurality of propellers of an aerial vehicle, wherein noises produced from rotation of each of the plurality of propellers is different;

receiving, using a microphone of the aerial vehicle and at a first time, a first noise produced by a first propeller of the plurality of propellers;

receiving, using the microphone and at a second time, a second noise produced by a second propeller of the plurality of propellers;

receiving, using the microphone and at a third time, a third noise produced by a third propeller of the plurality of propellers;

receiving, using the microphone and at a fourth time that is subsequent to the first time, a first reflection of the first noise reflected by an object within an environment;

receiving, using the microphone and at a fifth time that is subsequent to the second time, a second reflection of the second noise reflected by the object within the environment;

receiving, using the microphone and at a sixth time that is subsequent to the third time, a third reflection of the third noise reflected by the object within the environment;

determining, based at least in part on the first time and the fourth time, a first set of solutions corresponding to a first measured distance of the object with respect to the aerial vehicle;

determining, based at least in part on the second time and the fifth time, a second set of solutions corresponding to a second measured distance of the object with respect to the aerial vehicle;

determining, based at least in part on the third time and the sixth time, a third set of solutions corresponding to a third measured distance of the object with respect to the aerial vehicle;

determining a distance and a direction of the object with respect to the aerial vehicle as an intersection between the first set of solutions, the second set of solutions, and the third set of solutions; and modifying an operation of the aerial vehicle based at least in part on the distance and the direction of the object with respect to the aerial vehicle.

2. The computer-implemented method of claim 1, further comprising:
determining a time difference between the first time and the fourth time; and
determining the first measured distance based on a product of the time difference and a speed of sound.

3. The computer-implemented method of claim 1, wherein:
the first set of solutions include the first measured distance and all directions with respect to the aerial vehicle.

4. The computer-implemented method of claim 1, further comprising:
computing a time difference between the first time and the fourth time;
computing a speed of sound as a quotient of a distance between the first propeller and the microphone and the time difference; and
measuring the first measured distance based at least in part on the time difference and a speed of sound.

5. A method, comprising:
receiving, using one or more audio sensors of a vehicle and at a first time, a first noise produced by a first propulsion mechanism of a plurality of propulsion mechanisms of the vehicle;
receiving, using the one or more audio sensors and at a second time, a second noise produced by a second propulsion mechanism of the plurality of propulsion mechanisms;
receiving, using the one or more audio sensors and at a third time that is subsequent to the first time, a first reflection of the first noise reflected by an object within an environment;
receiving, using the one or more audio sensors and at a fourth time that is subsequent to the second time, a second reflection of the second noise reflected by the object within the environment;

determining, based at least in part on the first time and the third time, a first set of solutions corresponding to a first measured distance of the object with respect to the vehicle;

determining, based at least in part on the second time and the fourth time, a second set of solutions corresponding to a second measured distance of the object with respect to the vehicle; and determining a distance and a direction of the object with respect to the vehicle as an intersection between the first set of solutions and the second set of solutions.

6. The method of claim 5, further comprising:
computing a potential error; and
adjusting at least one of the distance or the direction based at least in part on the potential error.

7. The method of claim 5, further comprising:
receiving, using the one or more audio sensors and at a fifth time, a third noise produced by a third propulsion mechanism of the plurality of propulsion mechanisms;
receiving, using the one or more audio sensors and at a sixth time that is subsequent to the fifth time, a third reflection of the third noise reflected by the object within the environment;
determining, based at least in part on the fifth time and the sixth time, a third set of solutions corresponding to a third measured distance of the object with respect to the vehicle; and
determining the distance and the direction of the object with respect to the vehicle as an intersection of the first set of solutions, the second set of solutions, and the third set of solutions.

8. The method of claim 5, wherein:
the first set of solutions is a first sphere around the vehicle; and
the second set of solutions is a second sphere around the vehicle.

9. The method of claim 8, wherein the intersection is an intersection between the first sphere and the second sphere.

10. The method of claim 5, further comprising:
determining a time difference between the first time and the third time; and
determining the first measured distance based on a product of the time difference and a speed of sound.

11. The method of claim 5, wherein the one or more audio sensors includes at least one of:
an omnidirectional audio sensor that is configured to receive reflections from a plurality of directions relative to the vehicle, or
a plurality of directional audio sensors, each directional audio sensor configured to receive reflections from a respective direction relative to the vehicle.

12. The method of claim 5, wherein the vehicle is at least one of: an aerial vehicle, an unmanned aerial vehicle, a ground based vehicle, an unmanned ground based vehicle, a water based vehicle, or an unmanned water based vehicle.

13. The method of claim 5, further comprising:
measuring at least one environmental condition during operation of the vehicle; and
adjusting a speed of sound based at least in part on the at least one environmental condition.

14. The method of claim 5, wherein:
the first set of solutions include the first measured distance and all directions with respect to the vehicle.

15. An aerial vehicle apparatus, comprising:
a first propulsion mechanism;
a second propulsion mechanism;
one or more audio sensors;
one or more processors; and
a memory storing program instructions that when executed by the one or more processors cause the one or more processors to at least:
  receive a first noise detected by the one or more audio sensors at a first time, the first noise produced by the first propulsion mechanism;
  receive a second noise detected by the one or more audio sensors at a second time, the second noise produced by the second propulsion mechanism, wherein the first noise is different than the second noise;
  receive a first reflection of the first noise detected by the one or more audio sensors at a third time;
  receive a second reflection of the second noise detected by the one or more audio sensors at a fourth time;
  determine, based at least in part on the first time and the third time, a first set of solutions corresponding to a first measured distance of an object with respect to the aerial vehicle apparatus;
  determine, based at least in part on the second time and the fourth time, a second set of solutions corresponding to a second measured distance of the object with respect to the aerial vehicle apparatus; and
  determine a distance and a direction of the object with respect to the aerial vehicle apparatus as an intersection of the first set of solutions and the second set of solutions.

16. The aerial vehicle apparatus of claim 15, wherein a first distance between the first propulsion mechanism and the one or more audio sensors is different than a second distance between the second propulsion mechanism and the one or more audio sensors.

17. The aerial vehicle apparatus of claim 15, wherein program instructions that when executed by the one or more processors further cause the one or more processors to at least:
  compute a time difference between the first time and the third time;
  compute a speed of sound as a quotient of a distance between the first propulsion mechanism and the one or more audio sensors and the time difference; and
  measure the first measured distance based at least in part on the time difference and a speed of sound.

18. The aerial vehicle apparatus of claim 15, wherein the program instructions that when executed by the one or more processors further cause the one or more processors to at least:
  modify an operation of the aerial vehicle apparatus based at least in part on the distance and the direction of the object with respect to the aerial vehicle apparatus.

19. The aerial vehicle apparatus of claim 15, wherein the first set of solutions include the first measured distance and all directions with respect to the aerial vehicle apparatus.

20. The aerial vehicle apparatus of claim 15, wherein the program instructions that when executed by the one or more processors further cause the one or more processors to at least:
  compute a potential error; and
  adjust at least one of the distance or the direction based at least in part on the potential error.

* * * * *